US012649286B2

(12) United States Patent

Müller et al.

(10) Patent No.: US 12,649,286 B2

(45) Date of Patent: Jun. 9, 2026

(54) WELDING APPARATUS

(71) Applicant: Fresenius Kabi Deutschland GmbH, Bad Homburg (DE)

(72) Inventors: Marcus Müller, Ortenberg (DE); Lars Michel, Rosbach v.d. Höhe (DE); Michael Schäfer, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 0 days.

(21) Appl. No.: 17/879,565

(22) Filed: Aug. 2, 2022

(65) Prior Publication Data

US 2023/0039259 A1      Feb. 9, 2023

(30) Foreign Application Priority Data

Aug. 4, 2021    (EP) .................................... 21189624

(51) Int. Cl.
*B29C 65/04* (2006.01)
*B29C 65/00* (2006.01)
(Continued)

(52) U.S. Cl.
CPC .......... *B29C 65/04* (2013.01); *B29C 65/7841* (2013.01); *B29C 66/1142* (2013.01); *B29C 66/5221* (2013.01); *B29C 66/91655* (2013.01); *H05B 6/50* (2013.01); *H05B 6/62* (2013.01); *B29K 2627/06* (2013.01); *B29L 2023/005* (2013.01); *B29L 2023/22* (2013.01)

(58) Field of Classification Search
CPC . B29C 65/04; B29C 65/7841; B29C 66/1142; B29C 66/5221; B29C 66/91655; B29C 66/1122; B29C 66/431; B29C 66/71; B29C 66/73921; B29C 66/81419; B29C 66/81423; B29C 66/8322; B29C 66/857; B29C 66/8614; B29C 66/8618; B29C 66/9161; H05B 6/50; H05B 6/62; B29K 2627/06; B29L 2023/005; B29L 2023/22
See application file for complete search history.

(56) References Cited

U.S. PATENT DOCUMENTS 5,349,166 A * 9/1994 Taylor ............... B29C 66/91653
219/607
2005/0003785 A1* 1/2005 Jackson ................... G01S 7/35
455/260

(Continued)

FOREIGN PATENT DOCUMENTS

EP        3025849 A1    6/2016

OTHER PUBLICATIONS

European Search Report and Written Opinion issued in connection with counterpart EP Application No. 21189624, dated Jan. 5, 2022.

*Primary Examiner* — Christopher W Raimund

(74) *Attorney, Agent, or Firm* — Cook Alex Ltd.

(57) ABSTRACT

A welding apparatus (1) for radio-frequency, RF, welding, comprises: a clamp (10) having two electrodes (100, 101; 100', 101') being movable with respect to one another for clamping one or more items (2; 2') therebetween for a welding process; and an RF power supply (11) for providing an RF welding current to the electrodes (100, 101; 100', 101') of the clamp (10), the RF power supply being adapted to change the frequency of the RF welding current during the welding process.

15 Claims, 4 Drawing Sheets

(51) Int. Cl.
  *B29C 65/78*    (2006.01)
  *B29K 627/06*   (2006.01)
  *B29L 23/00*    (2006.01)
  *H05B 6/50*    (2006.01)
  *H05B 6/62*    (2006.01)

(56)     References Cited

U.S. PATENT DOCUMENTS

| 2008/0041847 | A1* | 2/2008 | Gruenspecht ........... B29C 65/04 |
|---|---|---|---|
| | | | 219/778 |
| 2009/0101286 | A1* | 4/2009 | Sumeer ............... B29C 66/1122 |
| | | | 219/769 |
| 2017/0266870 | A1 | 9/2017 | Lepple-Wienhues |
| 2018/0097520 | A1* | 4/2018 | Wu ................. H03K 19/00384 |

\* cited by examiner

WELDING APPARATUS

CROSS-REFERENCE TO RELATED APPLICATION

This application claims the benefit of and priority to European Application No. 21189624.6 filed on Aug. 4, 2021, the disclosure of which is incorporated herein by reference in its entirety.

The invention relates to a welding apparatus, to a system comprising such an apparatus and to a method for radio-frequency, RF, welding.

Radio-frequency energy can be used for welding items, e.g., plastic pipes, such as PVC pipes in medical applications. For this purpose, radio-frequency electric fields can be generated in an electronic circuit and coupled into the plastic material by a metal clamp. Molecules of the material of the items having dipole properties are excited by the applied frequency to oscillate. This effect provides heat for the welding process, melting the plastic material.

The range of radio frequencies comprises the high-frequency, HF, range and the very-high-frequency, VHF, range. HF is the ITU (International Telecommunication Union) designation for the range of radio-frequency electromagnetic waves from 3 to 30 megahertz (MHz). VHF is the ITU designation for the range of radio-frequency electromagnetic waves from 30 to 300 MHz. Depending on limits by electromagnetic compatibility, EMC, the frequency of welding apparatuses is commonly set to a value in a usable industrial, scientific and medical, ISM, band, such as 27 MHz or 40 MHz in many applications.

General advantages that can be achieved with RF welding are fast cycle times, which can be in the order of a few seconds, and generally good welding results.

RF welding apparatuses may be portable and comprise a battery as energy source. When the battery is low, the user may exchange or refill it, depending on whether the battery is exchangeable or rechargeable, but this typically leads to an interruption of the welding work.

Accordingly, such a welding apparatus for radio-frequency, RF, welding comprises a clamp and a radio-frequency, RF, power supply. The clamp has two electrodes being movable with respect to one another for clamping one or more items, e.g., a PVC tube, therebetween for conducting a welding process. The RF power supply provides an RF welding current to the electrodes of the clamp. Therein, the RF power supply is adapted to change the frequency of the RF welding current during an ongoing welding process of the clamped one or more items.

This allows to dynamically tune the frequency of the RF welding current and, in turn, improved welding results and a lower energy consumption. The conducting (e.g., metal) electrodes of the clamp together with the (particularly plastic) material of the weld item(s), e.g., pipe, form a capacitor with a specific impedance. The impedance is a function of the distance d between the electrodes, the area A of the electrodes, the frequency f of the RF field generated by applying the RF welding current to the electrodes and the relative permittivity $\varepsilon_r$, i.e., the dielectric constant, of the material of the weld item(s). For PVC, as an example, the relative permittivity $\varepsilon_r$ can initially be 3.1. The impedance may be calculated as follows:

$$Z=d/(2 \cdot \pi \cdot f \cdot \varepsilon_0 \cdot \varepsilon_r \cdot A).$$

Therein, $\varepsilon_0$ denotes the vacuum permittivity.

Commonly, electrical circuits of welding apparatuses known from practice are adjusted to one impedance by an internal bypass network to the clamp. However, during the welding process the impedance changes, particularly as the thickness of plastic material of the weld item(s) decreases and, thus, the distance d of the electrodes decreases. Due to this changing impedance, the coupling of RF energy into the material of the welt item(s) decreases and losses of the RF energy over the bypass network and due to wave reflections on a cable connecting the clamp because of mismatching to the input frequency increase. Thus, normally, the input energy is set to much higher values than the welding energy at the clamp to obtain good welding results. The frequency f of the RF welding current in known RF welding apparatuses is tuned to one impedance value which is a compromise and not the optimum for all conditions over the complete welding process.

Since the welding apparatus described herein, on the other hand, allows to change the frequency f of the RF welding current during the welding process, the impedance (see the equation above) can be changed during the welding process. This allows it to adapt the frequency f, e.g., continuously or stepwise, to hold a matching impedance value over the complete welding process. This allows improved overall welding results and to decease the losses of energy and, thereby, in mobile applications, an increased battery life and/or a reduced battery size.

The RF power supply may comprise an RF signal generator adapted to generate an RF signal based on a sensor signal. This allows a precise adaption of the frequency to a current status of the welding process.

Particularly, the RF power supply may comprise a controller being adapted to receive the sensor signal and being coupled to the RF signal generator so as to provide a command to the RF signal generator based on the sensor signal. Therein, the RF signal generator may be adapted to generate the RF signals in accordance with the command. That is, the controller may receive the sensor signals and determine a frequency based thereon. The RF signal generator accepts commands of the controller and sets the generated frequency based on the commands. This allows an efficient calculation and a simple electronic setup.

As an example, the RF power supply can comprise a current sensor to provide the sensor signal. The sensor signal may be indicative for a current strength in the RF power supply, e.g., for the RF welding current. Alternatively, the sensor signal may be indicative for a bypass current over a bypass network of the RF power supply. As another example, alternatively or in addition, the welding apparatus may comprise a distance measuring unit adapted to measure the distance d of the clamp electrodes and to provide sensor signals (e.g., to the controller), so that the RF signal generator can generate an RF signal based on such a sensor signal. Using sensor signals allows to set the frequency particularly close to a dynamically changing optimum value. Using a current sensor allows a precise and simple measurement. By measuring the current allows to estimate the above-described loss effects. The sensor signal may be used in a control loop of the controller. For example, when the sensor signal indicates a current value that is below or above a predefined threshold, the controller may effect a change of the frequency, e.g., by one or more predefined steps.

The RF power supply may particularly comprise an amplifier. The amplifier has an input, e.g., coupled to the RF signal generator to receive the RF signal from the RF signal generator. The amplifier may be adapted to amplify the RF signal in order to generate the RF welding current. The amplifier has an output which may be connectable or connected to the clamp in order to provide the RF welding current to the clamp electrodes. This allows a simple setup.

The output of the amplifier may be coupled to a bypass capacitor. The bypass capacitor allows to improve the generated RF field.

Optionally, the RF signal generator is adapted to process digital frequency signals. As such, the RF signal generator may comprise an input accepting commands in digital form, e.g., over an SPI (Serial Peripheral Interface). This allows to perform the calculation of the target RF frequency digitally (instead of analogously), what allows a high precision and fast response times with a simple setup.

For example, the RF signal generator can comprise or consist of a direct-digital-synthesis converter, DDS converter. DDS converter integrated circuits (ICs) are available at low costs and in very small sizes.

The welding apparatus, in particular the DDS converter therein, may comprise a digital-to-analog converter. Thus, the DDS converter may first create a digital RF signal and convert the digital RF signal into an analogue RF signal. For example, the analogue RF signal is provided to the amplifier as input. This allows a particularly high precision.

Particularly, the RF power supply may be adapted to set the frequency of the RF welding current while the welding process is ongoing based on a target impedance. The target impedance may be set to a predetermined or preconfigurable value.

Optionally, the RF power supply is adapted to change the frequency of the RF welding current while the welding process is ongoing in predefined frequency steps. For example, the RF power supply may have an output frequency resolution which defines the finest possible frequency steps in which the frequency of the RF welding current can be increased or decreased. In particular, the predefined frequency steps may be larger than the finest possible frequency steps of the RF power supply. That is, while the RF power supply could, e.g., in general be able to change the frequency with finer steps, it is configured to perform changes of the frequency in the (larger) predefined steps. In particular, the change of the frequency may be performed stepwise instead of continuously. This allows a simplified calculation.

According to an option, the RF power supply is adapted to avoid a use of a given frequency (step) longer than a predefined time interval and/or avoid a repeated use of a given frequency (step) within another or the same predefined time interval during one welding process. For example, the controller may store a maximum usage time, and can be configured to change the frequency when the RF welding current has been provided with a certain frequency for this maximum usage time. Further, the controller may store a minimum repetition time interval, and may be adapted to use only those frequencies that have not been used within the minimum repetition time interval before the current time. For example, if the controller determines at a certain point in time that the optimal frequency step based on a sensor signal has been used within the minimum repetition time interval preceding the point in time, the controller may search for the frequency step closest to the optimal frequency step that has not yet been used within that minimum repetition time interval preceding the point in time. This allows to reduce quasi-peak and average values of electromagnetic emissions in the various frequencies. As a result, possible interferences with other electronic devices may be strongly reduced.

According to an aspect, a welding system comprising the welding apparatus according to any aspect or embodiment described herein is provided. The welding system further comprises at least one item to be welded, e.g., in the form of a plastic tube or hose, particularly a PVC tube or hose.

According to an aspect, a method for radio-frequency, RF, welding is provided. The method comprises the following steps: clamping one or more items to be welded between two electrodes of a clamp, the electrodes being movable with respect to one another for a welding process; providing an RF welding current to the electrodes of the clamp so as to weld the one or more items; changing the frequency of the RF welding current during the welding process; and releasing the welded one or more items from the clamp to finish the welding process.

The method may use the welding apparatus of any aspect or embodiment described herein for the RF welding.

The idea underlying the invention shall subsequently be described in more detail with reference to the embodiments shown in the figures. Herein:

DETAILED DESCRIPTION OF THE FIGURES

Figure 1:
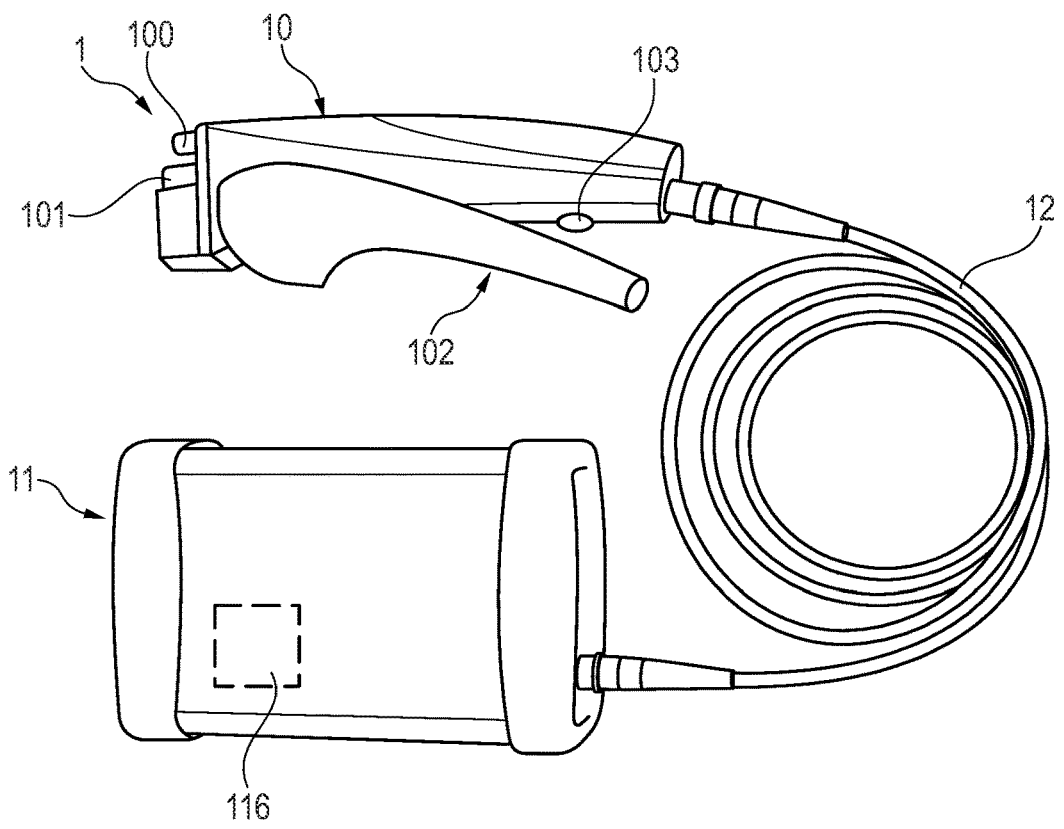
FIG. 1 shows a schematic view of a welding apparatus for radio-frequency, RF, welding, having an RF power supply and a clamp.

FIG. 1 shows a welding apparatus 1 for radio-frequency welding, RF welding. The welding apparatus 1 comprises a clamp 10 and an RF power supply. The RF power supply 11 is electrically connected to the clamp 10 via a cable 12.

The clamp 10 comprises a pair of electrodes 100, 101, which are displaceable with respect to one another. More precisely, one of the electrodes 101 (in the view of FIG. 1 the lower one) can be moved with respect to the other electrode 100 on a body of the clamp 10. The movable electrode 101 may be displaced towards the other electrode 100 in order to clamp an item between the electrodes 100, 101 and exert a clamping force on the item. To displace the movable electrode 101 towards the other electrode 100, the clamp comprises a handle 102 which is operable by a user. When the user releases the handle 102, the movable electrode 101 is displaced away from the other electrode 100. The clamp 10 further comprises an optional switch 103 which is pushed when the handle 102 is operated. The switch 103 activates the RF power supply 11. The electrodes 100, 101 are made of metal, e.g., comprise copper.

The RF power supply 11 provides an RF welding current to the electrodes 100, 101 of the clamp 10 via the cable 12. As will be described in further detail below, the RF power supply is adapted to change the frequency of the RF welding current during an ongoing welding process. The frequency of the RF welding current may be in the HF range and/or in the VHF range.

The welding apparatus 1 is portable and usable without being connected to a power socket. The RF power supply 11 comprises an electrical battery 116 as power source. The battery 116 is rechargeable and/or replaceable.

Figure 2:
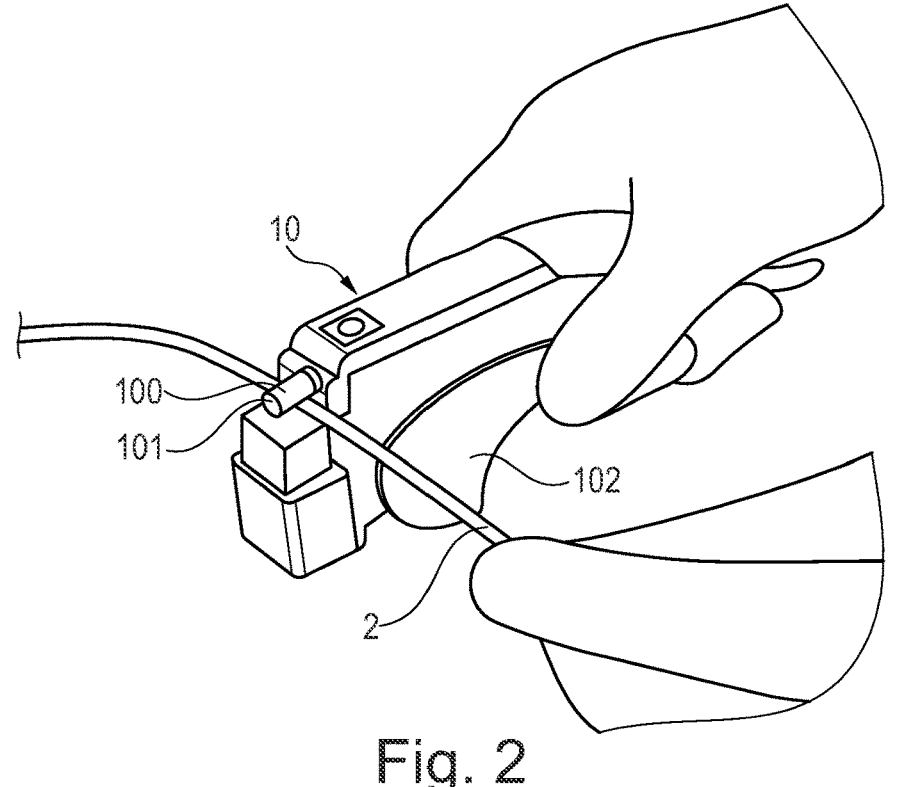
FIG. 2 shows a schematic view of an ongoing welding process of an item using the RF welding apparatus of FIG. 1.

FIG. 2 shows the clamp 10 in operation. The user has arranged an item 2 between the electrodes 100, 101 and, in the status shown in the figure, operates the handle 102. Thus, the RF power supply 11 provides an RF welding current to the electrodes 100, 101. This creates an RF electromagnetic field heating the material of the item 2.

In the example of FIG. 2, the item 2 is a plastics hose, more precisely, a PVC (polyvinyl chloride) hose for medical use. By heating the material of the item 2 and the application of the clamping force, opposing sides of the hose are pressed against each other and welded together. Notably, this welding is possible even if a liquid, e.g., blood, is disposed inside the hose.

Thus, according to FIG. 2, a single item 2 is clamped by the electrodes for conducting a welding process. However, it is also possible to clamp more than one item at the same time and weld these two or more items together.

Materials being particularly suitable for RF welding are PVC that has already been mentioned above, chlorinated polyvinyl chloride (CPVC), polyurethane, nylons, cellulose acetate, ethylene-vinyl acetate (EVA), polyvinylidene chloride (PVDC), polyethylene terephthalate (PET) and other materials having dipoles.

Figure 3:
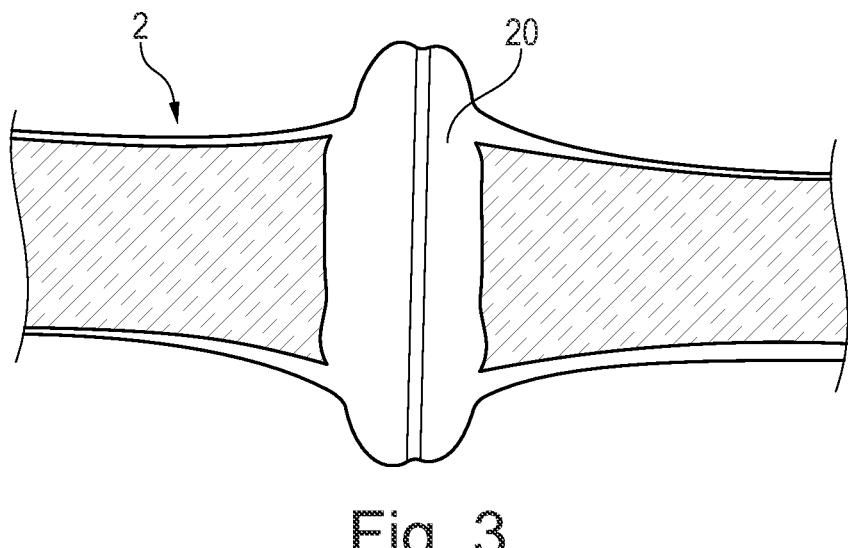
FIG. 3 shows a schematic view of the item of FIG. 2 having a weld seam after the RF welding process.

FIG. 3 shows the result of the RF welding process. A weld seam 20 has been created on the item 2. The weld seam blocks a passage of the item 2 in a fluid-tight manner. The weld seam divides the inner space of the hose in two parts. At the weld seam, the item 2 may be cut into two pieces having closed ends.

Such a welding process is desired in many situations, particularly in medical applications. For example, when a hose or tube of a blood bag needs to be sealed.

Figure 4:
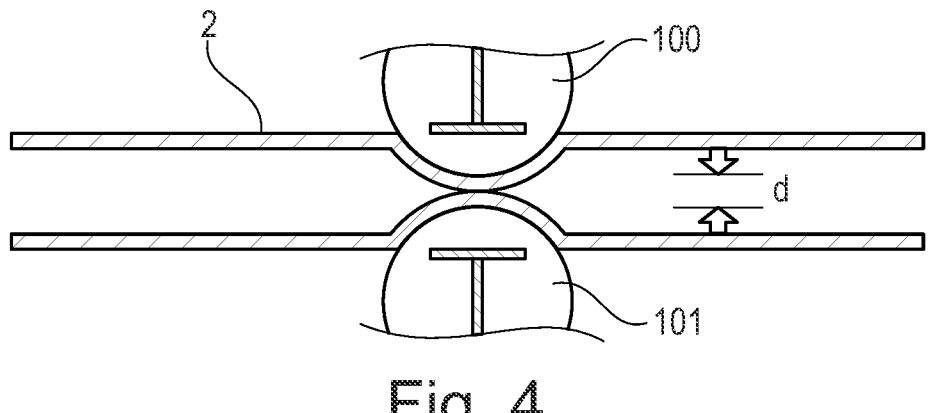
FIG. 4 shows a schematic view of electrodes of the clamp of the welding apparatus of FIG. 1 with the item of FIG. 2 clamped therebetween.

FIG. 4 shows a cross section of the electrodes 100, 101 and the item 2 therebetween during the welding process. The electrodes 100, 101 squeeze the item 2 together. As will be described in greater detail below, the electrodes 100, 101 together form a capacitor. The impedance of this capacitor depends on, among other variables, the distance d between the two electrodes. 100, 101. During the welding process the material of the item 2 is heated and melted. Due to the exerted clamp force the distance d is reduced during the welding process. By this the impedance of the electrodes 100, 101 is changed over time during the ongoing welding process.

Figure 5:
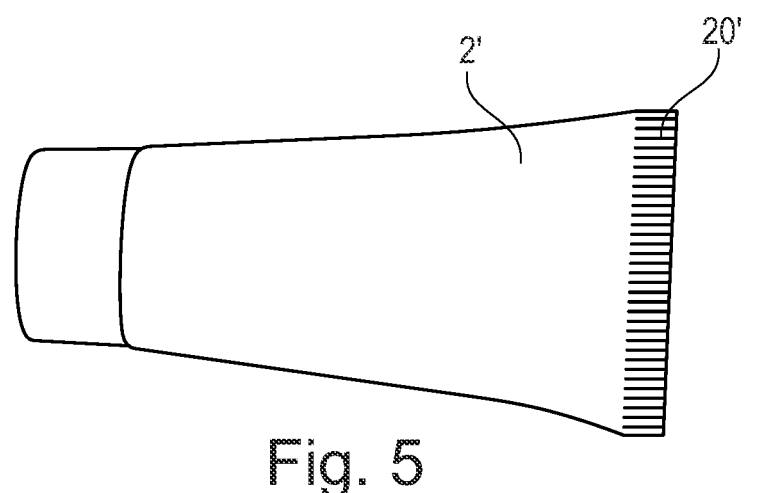
FIG. 5 shows a schematic view of another item having a weld seam after an RF welding process.
Figure 6:
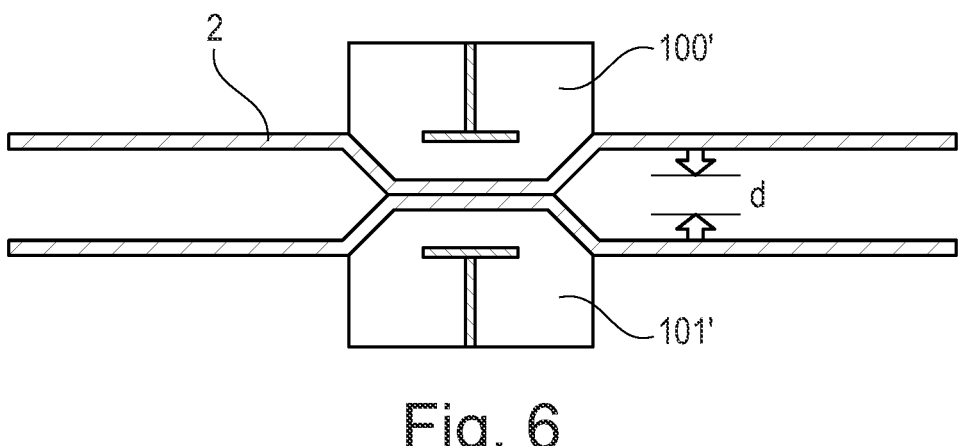
FIG. 6 shows a schematic view of electrodes for the clamp of the welding apparatus of FIG. 1 for creating the weld seam of the item of FIG. 5.

FIGS. 5 and 6 show another example of an application and weld seam 20'. FIG. 5 shows an item 2' in the form of a tube, e.g., a toothpaste tube. At one end, the tube is closed and sealed by means of the weld seam 20'. The weld seam 20' has a generally flat shape. To create the weld seam 20' of FIG. 5, electrodes 100', 101' with parallel flat surfaces as shown in FIG. 6 can be applied as an alternative to the electrodes 100, 101 of FIGS. 1-4 having round cross sections.

The electrodes 100', 101' shown in FIG. 6 can be used for hoses and to create flat weld seams 20' as shown in FIG. 5.

Figure 7:
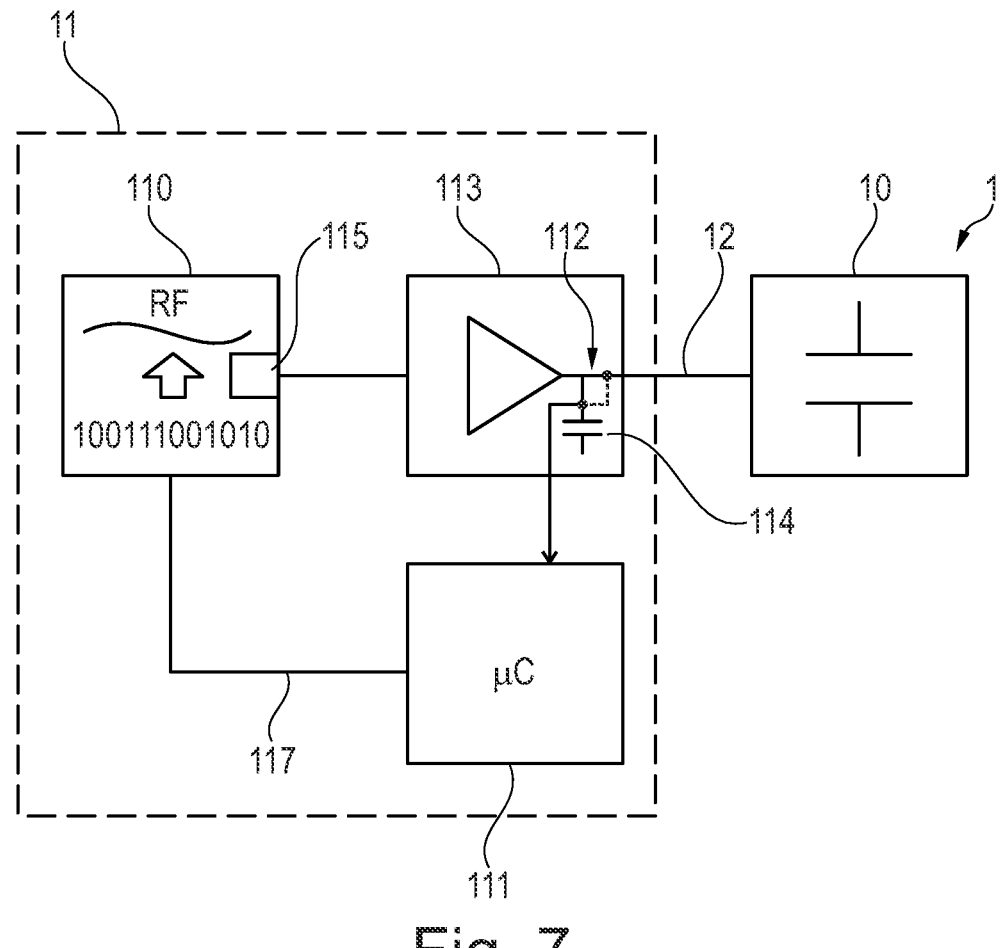
FIG. 7 shows a schematic block diagram of the welding apparatus of FIG. 1.

FIG. 7 shows various components of the welding apparatus 1 and, particularly, of the RF power supply 11. The RF power supply 11 comprises an RF signal generator 110. The RF signal generator 110 is configured to generate an RF signal based on a sensor signal. In the example of FIG. 7, the RF signal generator 110 is a direct-digital-synthesis (DSS) converter. As such, the RF signal generator 110 is adapted to receive commands with digital signals being indicative for a frequency as input.

The RF signal generator 110 is configured to produce an analog waveform, e.g., a sine wave, by generating a time-varying signal in digital form and then performing a digital-to-analog conversion. Because operations within a DDS device such as the RF signal generator 110 are primarily digital, it can offer fast switching between output frequencies, fine frequency resolution, and operation over a broad spectrum of frequencies. Additionally, DDS devices can be manufactured very compact (e.g., as ICs) and to draw little power.

Thus, the RF signal generator 110 comprises a digital-to-analog converter 115. An output of the digital-to-analog converter 115 is provided to an input of an amplifier 113 of the RF power supply 11. The amplifier 113 amplifies the RF signal provided at the input and outputs an amplified RF welding current. The RF welding current is provided to the clamp 10 electrodes 100, 101; 100', 101' via the cable 12.

The RF power supply 11, in particular the amplifier 113 thereof, further comprises a bypass network. More specifically, the amplifier 113 comprises a bypass capacitor 114. The bypass capacitor 114 is electrically connected to the amplifier 113 output and a reference potential, such as ground potential. Thus, the electrical circuit is adjusted to an impedance by an internal bypass network to the clamp 10.

One or more current sensor(s) 112 is/are provided to measure a current on the output side of the amplifier 113. For example, a current sensor 112 may be arranged on an electric connection between the amplifier 113 output and the clamp 10, e.g. within the RF power supply 11, for measuring the current strength in the electric connection between the amplifier 113 output and the clamp 10. Alternatively, or in addition, a current sensor 112 may be arranged on the bypass network, e.g., on an electric connection between the amplifier 113 output and the bypass capacitor 114, for measuring the current strength in the electric connection between the amplifier 113 output and the bypass capacitor 114.

A controller 111 of the RF power supply is operatively connected to the current sensor 112 (or current sensors 112). The controller 111 may be a microcontroller. The controller 111 is configured to receive sensor signals of the current sensor(s) 112. Further, the controller 111 is configured to generate commands based on the sensor signals. For example, a regulation loop for the adaptation of the frequency is implemented in the controller 111, e.g., in software. The parameters of the regulation loop are adaptable, e.g., to different plastic materials and/or conditions (e.g., by the software). For example, the RF power supply 11 may be configured to set the frequency of the RF welding current during the welding process based on a target impedance. Energy losses on the bypass network may, hence, be much lower and the matching to the RF circuit can be improved over the complete welding process.

The controller 111 is operatively coupled to the RF signal generator 110 and configured to provide the commands to the RF signal generator 110. In turn, the RF signal generator 110 is configured to receive the commands, and to generate the RF signals in accordance with the commands. The commands are digital commands. The controller 111 and the RF signal generator 110 are operatively coupled to one another by means of an interface 117. The interface 117 is a digital communication interface. For example, the interface may be an SPI (Serial Peripheral Interface). SPI devices may communicate in full duplex mode using a master-slave architecture with a single master. Here, the controller 111 may serve as master device.

This setup allows to adapt the frequency f to the varying capacitance value of the welding clamp 10. The current sensor 112 may sense the RF welding current continuously. Depending on the measured current strength the frequency of the RF welding current is adapted to match the RF circuit. The matching thus includes the floating impedance on the clamp 10. For example, the controller 111 may be configured to determine an energy loss over the bypass network based on the current sensor signals. This allows to deduce that a change of the frequency should be performed. In a very simple variant, the controller 111 determines the need for a change of the frequency and determines a better matching frequency by applying a higher frequency and a lower frequency, and determining which of these frequencies leads to lower energy losses (e.g., to the lower current over the bypass network and/or to the higher current to the clamp 10).

Due to the adjustable frequency of the RF welding current, the frequency of electromagnetic emissions may be outside of free usable ISM (industrial, scientific, and medical) bands. Thus, for several applications (and output power levels), it may be necessary to ensure that radiated emissions are kept under certain, e.g., predefined EMC limits, e.g., to prevent interference with other electronic systems.

Limiting the radiated emissions is possible by means of the controller 111, e.g., by means of a software algorithm of the controller 111. The software algorithm (more generally, the controller 111) is configured to split a predefined frequency range into a plurality of steps and/or to store a plurality of frequency steps within the predefined frequency range. The predefined frequency range is the range of frequencies that the controller 111 may select. Therein, the controller may be adapted to select only a frequency of the a given step. The frequencies between two adjacent steps are avoided by the controller 111. The steps may be equidistant or have different sizes. The controller 111 is configured to repeat selecting one of the plurality of steps to set the output frequency depending on the welding process. The frequency steps may be defined to be wider than the smallest possible steps following from an output frequency resolution of the RF power supply 11 and/or than a predefined resolution bandwidth, e.g., defined by an EMC standard, which, e.g., is adjusted in corresponding measuring equipment.

Further, the controller 111 (e.g., the software algorithm) may be configured to monitor and/or limit a tuning time for each frequency step (e.g., by a predefined maximum tuning time) and/or prevent the repeated use of a frequency step in (rapid) succession. For example, the same frequency step is prevented to be selected again within a predefined time period. This behavior of the software algorithm allows to maintain the radiated emissions during the welding process below quasi-peak (QP) and average (AV) limit values and, thereby, interference with other electronic devices.

Figure 8:
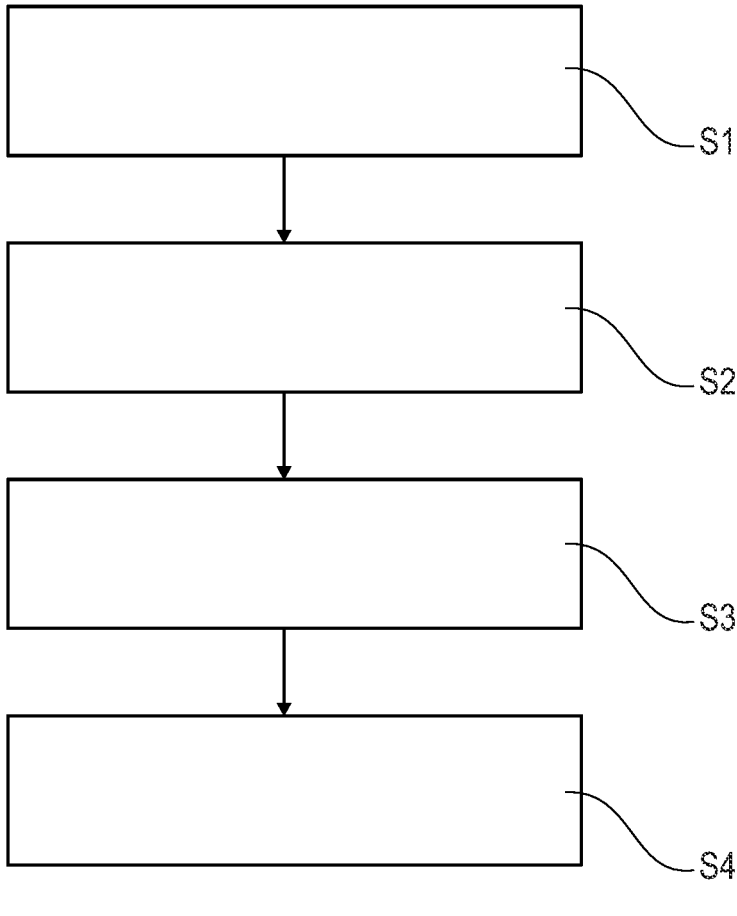
FIG. 8 shows a flow diagram of a method for RF welding.

FIG. 8 shows a method for radio-frequency, RF, welding. The method comprises the following steps.

Step S1: Clamping one or more items 2; 2' between the two electrodes 100, 101; 100', 101' of the clamp 10 described above, the electrodes 100, 101; 100', 101' being movable with respect to one another for the welding process.

Step S2: Providing the RF welding current to the electrodes 100, 101; 100', 101' of the clamp 10 for welding the one or more items 2; 2'.

Step S3: Changing the frequency of the RF welding current during the welding process. This may particularly include an adaptation of the frequency to changing welding conditions as describe above.

Step S4: Releasing the welded one or more items 2; 2' from the clamp 10.

The described apparatus and method allow to reduce energy losses. Because of reduced energy losses, the usage time of mobile applications can be increased. Risks of damaged circuits due to mismatching of RF circuits, can be reduced. Welding results can be more stable and reproducible, even with different plastic materials and/or thermal characteristics of the items. Hence, the welding system can be more flexible with respect to different applications.

LIST OF REFERENCE NUMERALS

1 Welding apparatus
10 Clamp
100; 100' Electrode
101; 101' Electrode
102 Handle
103 Switch
11 RF power supply
110 RF signal generator
111 Controller
112 Current sensor
113 Amplifier
114 Bypass capacitor
115 Digital-to-analog converter
116 Battery
117 Interface
12 Cable
2; 2' Item
20 Weld seam

The invention claimed is:

1. A portable welding apparatus for radio-frequency, RF, welding, comprising:
   a clamp having two electrodes being movable with respect to one another for clamping one or more items therebetween for a welding process, the clamp comprising a handle operable by a user to displace one of the electrodes relative to the other; and
   an RF power supply for providing an RF welding current to the electrodes of the clamp, the RF power supply being adapted to change the frequency of the RF welding current during the welding process, the RF power supply comprising an electrical battery as a power source.

2. The portable welding apparatus according to claim 1, wherein the RF power supply comprises an RF signal generator to generate an RF signal based on a sensor signal.

3. The portable welding apparatus according to claim 2, wherein the RF power supply comprises a controller adapted to receive the sensor signal and coupled to the RF signal generator to provide a command to the RF signal generator based on the sensor signal, wherein the RF signal generator is adapted to generate the RF signal in accordance with the command.

4. The portable welding apparatus according to claim 2, wherein the RF power supply comprises a current sensor to provide the sensor signal, the sensor signal being indicative for the RF welding current.

5. The portable welding apparatus according to claim 2, wherein the RF power supply comprises an amplifier having an input coupled to the RF signal generator to receive the RF signal from the RF signal generator, being adapted to amplify the RF signal to generate the RF welding current, and having an output for providing the RF welding current to the clamp.

6. The portable welding apparatus according to claim 5, wherein the output of the amplifier is coupled to a bypass capacitor.

7. The portable welding apparatus according to claim 2, wherein the RF signal generator is adapted to process digital frequency signals.

8. The portable welding apparatus according to claim 2, wherein the RF signal generator comprises or consists of a direct-digital-synthesis converter.

9. The portable welding apparatus according to claim 2, wherein the RF signal generator comprises a digital-to-analog converter.

10. The portable welding apparatus according to claim 1, wherein the RF power supply is adapted to set the frequency of the RF welding current during the welding process based on a target impedance.

11. The portable welding apparatus according to claim 1, wherein the RF power supply is adapted to change the frequency of the RF welding current during the welding process in predefined frequency steps.

12. The portable welding apparatus according to claim 11, wherein the RF power supply is adapted to change the frequency of the RF welding current after a predefined time interval.

13. A welding system comprising the portable welding apparatus according to claim 1 and an item in the form of a plastic tube or hose.

14. The portable welding apparatus according to claim 1, wherein the RF power supply is adapted to avoid a repeated use of a frequency within a predefined time interval.

15. A method for radio-frequency, RF, welding, using a portable welding apparatus comprising a clamp having two electrodes and an RF power supply, the method comprising:

clamping, with the clamp, one or more items between the two electrodes for a welding process, wherein the clamp comprises a handle configured to be operated by a user, the electrodes being movable with respect to one another by operating the handle;

providing an RF welding current to the electrodes of the clamp, with the RF power supply, for welding the one or more items;

changing the frequency of the RF welding current, with the RF power supply, during the welding process; and releasing the welded one or more items from the clamp by moving the electrodes with respect to one another, wherein the RF power supply comprises an electrical battery as a power source.

* * * * *